(12) United States Patent
Kim et al.

(10) Patent No.: US 11,655,084 B2
(45) Date of Patent: May 23, 2023

(54) SEALING PACKING COUPLED TO CONTAINER LID

(71) Applicant: NEOFLAM INC., Wonju (KR)

(72) Inventors: Hyun Dong Kim, Wonju (KR); Ju Yeon Yun, Jinju (KR); Jae Uk Kim, Wonju (KR)

(73) Assignee: NEOFLAM INC., Wonju (KR)

( * ) Notice: Subject to any disclaimer, the term of this patent is extended or adjusted under 35 U.S.C. 154(b) by 0 days.

(21) Appl. No.: 17/055,750

(22) PCT Filed: Jan. 28, 2020

(86) PCT No.: PCT/KR2020/001264
§ 371 (c)(1),
(2) Date: Nov. 16, 2020

(87) PCT Pub. No.: WO2020/222240
PCT Pub. Date: Nov. 5, 2020

(65) Prior Publication Data
US 2021/0206549 A1    Jul. 8, 2021

(30) Foreign Application Priority Data
May 2, 2019 (KR) .................. 10-2019-0051373

(51) Int. Cl.
*B65D 53/02* (2006.01)
*B65D 43/02* (2006.01)
(Continued)

(52) U.S. Cl.
CPC ............ *B65D 53/02* (2013.01); *B65D 43/02* (2013.01); *B65D 51/1683* (2013.01); *B65D 81/20* (2013.01); *F16K 15/1825* (2021.08); *F16K 24/00* (2013.01); *B65D 2205/02* (2013.01); *B65D 2543/00972* (2013.01)

(58) Field of Classification Search
CPC ...... B65D 2205/02; B65D 2543/00092; B65D 2543/00972; B65D 43/02; B65D 51/16; B65D 51/1672; B65D 51/1683; B65D 53/02; B65D 81/20; B65D 81/2038; F16K 15/144; F16K 15/182; F16K 15/1825; F16K 15/1845; F16K 24/00
USPC ............... 215/307, 311; 220/203.04, 203.11, 220/203.28, 231, 233, 367.1, 378
See application file for complete search history.

(56) References Cited

U.S. PATENT DOCUMENTS 5,449,079 A * 9/1995 Yang ................. B65D 81/2038
                                                       215/262
6,990,994 B2 * 1/2006 Reeb ..................... F16K 15/205
                                                       137/232
(Continued)

FOREIGN PATENT DOCUMENTS

EP          1332982 B1    5/2005
KR       200311423 Y1    4/2003
(Continued)

*Primary Examiner* — James N Smalley
*Assistant Examiner* — Madison L Poos
(74) *Attorney, Agent, or Firm* — Patentfile, LLC; Bradley C. Fach; Steven R. Kick (57) ABSTRACT

The present invention has the advantage of allowing a user to establish or release a seal between a container and a container lid with a single touch through a seal packing made of an elastic material and having a simple structure.

5 Claims, 6 Drawing Sheets

(51) Int. Cl.
  *B65D 81/20* (2006.01)
  *F16K 24/00* (2006.01)
  *B65D 51/16* (2006.01)
  *F16K 15/18* (2006.01)

(56) References Cited

U.S. PATENT DOCUMENTS

| | | | |
|---|---|---|---|
| 2002/0066732 A1* | 6/2002 | Ogino | A47J 47/10 |
| | | | 220/203.04 |
| 2008/0217335 A1* | 9/2008 | Chen | B65D 81/2038 |
| | | | 220/231 |
| 2010/0263328 A1 | 10/2010 | Dorsey et al. | |
| 2010/0270304 A1 | 10/2010 | Chen | |
| 2015/0060446 A1* | 3/2015 | Park | B65D 81/2038 |
| | | | 220/345.6 |
| 2016/0257475 A1* | 9/2016 | Gervais | B65D 43/0214 |
| 2021/0070524 A1* | 3/2021 | Wei | B65D 45/20 |
| 2021/0310573 A1* | 10/2021 | Jwo | F16K 15/202 |

FOREIGN PATENT DOCUMENTS

| | | |
|---|---|---|
| KR | 200437807 Y1 | 12/2007 |
| KR | 200441528 Y1 | 8/2008 |
| KR | 101616828 B1 | 5/2016 |
| KR | 101685441 B1 | 12/2016 |
| WO | 2012152246 A1 | 11/2012 |

\* cited by examiner

SEALING PACKING COUPLED TO CONTAINER LID

This Application is a 35 U.S.C. 371 National Stage Entry of International Application No. PCT/KR2020/001264 filed on Jan. 28, 2020, which claims the benefit of Republic of Korea Patent Application No. 10-2019-0051373, filed on May 2, 2019, the entire disclosures of which are incorporated by reference herein.

BACKGROUND OF THE DISCLOSURE

Field of the Disclosure

The present disclosure relates to a sealing packing coupled to the container lid and, more particularly, to a sealing packing coupled to the container lid, which is formed of an elastic material in a simple structure, so that a user is able to seal or unseal a space between a container and the container lid with one touch.

Related Art

In general, when food is stored in a restaurant or at home, an airtight container with excellent ability of sealing is used to prevent the food from being damaged by contact with air and to prevent smell of the food from leaking to the outside.

A good airtight container has excellent ability of sealing so that food is not damaged and the smell of the food does not leak out, and the good airtight container is easily stored in a refrigerator or cabinet and made suitable for the purpose of use, such as size.

Such an airtight container can keep food fresher than using plastic bags, completely prevent odors, and can be used semi-permanently unlike the plastic bags, so the airtight container is more widely used because of the eco-friendly characteristic.

Meanwhile, it is important to keep a container body and a container lid of the airtight container as tightly as possible when storing food and to easily open the container lid with a simple operation when taking out food from the airtight container.

Airtight containers having such functional characteristics have been disclosed in various embodiments, among which there is Patent Literature 1 titled "Vacuum airtight lid using a vacuum airtight packing (Korean Patent No. 10-1953326)."

The "vacuum airtight lid using a vacuum airtight packing" of Patent Literature 1 includes: a lid body provided with a vacuum forming means capable of forming the inside of the container in a vacuum state; a vacuum packing member fixedly installed in an edge of the lid body to be brought into close contact with an inner wall of the container to seal the container, wherein when a vacuum state of the container is induced due to an operation of the vacuum forming means in a state in which the container is sealed, the vacuum packing member is brought into close contact with an upper surface of an outer circumference of the container to keep the inside of the container in the vacuum state; and a packing coupling means formed in the edge of the lid body to fixedly couple the vacuum packing member to the edge of the lid body. The vacuum packing member comprises: a packing body fixedly installed to be in close contact with the edge of the lid body; an airtight packing portion formed in a lower end of the packing body to extend outward, wherein a packing wing is having a predetermined curved surface and a shape of being bent upward, and wherein the packing wing is brought into an inner wall of the container to be deformed upward and thereby seal the container; and a vacuum packing portion formed to extend upward horizontally to an upper end of the packing body to have a predetermined spacing above the packing wing, so that when the vacuum state of the inside of the container is induced in a state in which the container is sealed by the airtight packing portion, the vacuum packing portion is brought into close contact with the upper end surface of the outer circumference of the container to keep the vacuum state of the inside of the container. In the vacuum packing portion, a plurality of concave-convex portions is formed in a bottom surface in close contact with the upper surface of the container, and a packing support portion is formed to extend in a manner of protruding horizontally from the packing wing of the airtight packing part to be closely supported at the bottom of the lid body, so that the packing support portion is brought into close contact with the bottom of the lid body. The packing coupling means includes: a concave portion adjacent to the edge of the lid body and formed to be concave downward so that the vacuum packing member can be coupled and fixed to the edge of the lid body; a vertical coupling portion having a vertical portion formed to be bent upward at an outer end of the concave portion, so that the packing body portion of the vacuum packing member is installed in close contact with the vertical portion; a horizontal coupling portion having a horizontal portion formed at an outer end of the vertical coupling portion horizontally to be bent outward, so that the vacuum packing portion of the vacuum packing member is installed in close contact with the horizontal portion; and a hooking portion formed to be bent downward from the outer end of the horizontal portion of the horizontal coupling portion so as to support the end portion of the vacuum packing portion of the vacuum packing member. A packing fixing portion capable of fixing the vacuum packing member is formed in the vertical coupling portion, a fitting groove portion is formed in the packing fixing portion to be bent so as to be concave inwardly from the vertical portion, and a fitting protrusion is formed to protrude from the packing body to correspond to the fitting groove, so that the fitting protrusion is fitted into the fitting groove. Accordingly, there is an advantage that it is possible to achieve more simply vapor discharge and vacuum condition in the container along with packing by the lifting operation.

However, the "vacuum airtight lid using a vacuum airtight packing" of Patent Literature 1 has a large number of components such as the vacuum packing member, the packing coupling means, and the vacuum forming means, and thus, there is a problem that replacement costs are high when the parts are damaged, and it is not convenient and easy to use the vacuum airtight lid.

SUMMARY

An aspect of the present disclosure provides a sealing packing coupled to the container lid, which is formed of an elastic material in a simple structure, so that a user is able to seal or unseal a space between a container and the container lid with one touch.

According to an aspect of the present disclosure, there is provided a sealing packing to be coupled to a container lid, wherein the sealing packing is coupled to a first air passage hole formed in a center of the container lid to bring the container lid to tightly contact a container depending on pressurization, the sealing packing including: an airtight plate coupled to an upper side of the container lid and having a second air passage hole communicating with the first air passage hole in a center; a plurality of elastic support racks protruding upwardly from an edge of the second air passage hole to elastically deform; a third air passage hole through which air passes between the elastic support rack and the elastic support rack; and a pressing member provided to form a curved surface in an upper side of the airtight plate to enable elastic deformation, wherein upper sides of the elastic support racks are coupled to an inner upper side, and wherein a pressurization chamber is formed as a space inside the pressing member.

Further, the pressing member may have a semicircular cross-section.

Further, a folding guide groove may be recessed in an upper circumference of the pressing part to guide a lower outer surface of the pressing part to be turned over in a process of pressing the central portion of the pressing member.

Further, a thickness of the pressing member may increase from an upper central portion to a lower end portion.

Further, the second air passage hole may have a size that causes a lower central portion of the pressing member to be fitted into the second air passage hole without causing forced fitting in a state in which the pressing member is turned over as a user presses the central portion of the pressing member with a finger.

Advantageous Effects

As described above, according to the present disclosure, there is an advantage that a sealing packing coupled to the container lid is formed of an elastic material in a simple structure, so that a user is able to seal or unseal a space between a container and the container lid with one touch.

DESCRIPTION OF EXEMPLARY EMBODIMENTS

Hereinafter, a sealing packing 100 coupled to a container lid according to an embodiment of the present disclosure will be described in detail with reference to the accompanying drawings. First, it is also noted that like reference numerals denote like elements in appreciating the drawings. In describing the present disclosure, detailed descriptions related to well-known functions or configurations will be ruled out in order not to unnecessarily obscure subject matters of the present disclosure.

Figure 2:
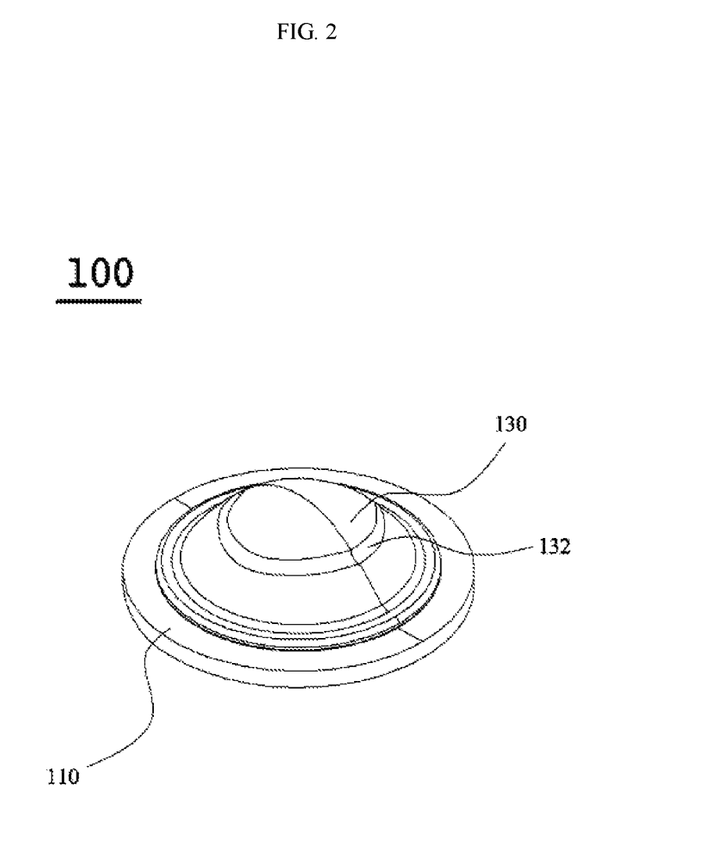
FIG. 2 is a perspective view showing a closed state of a sealing packing coupled to a container lid according to a preferred embodiment of the present disclosure.
Figure 3:
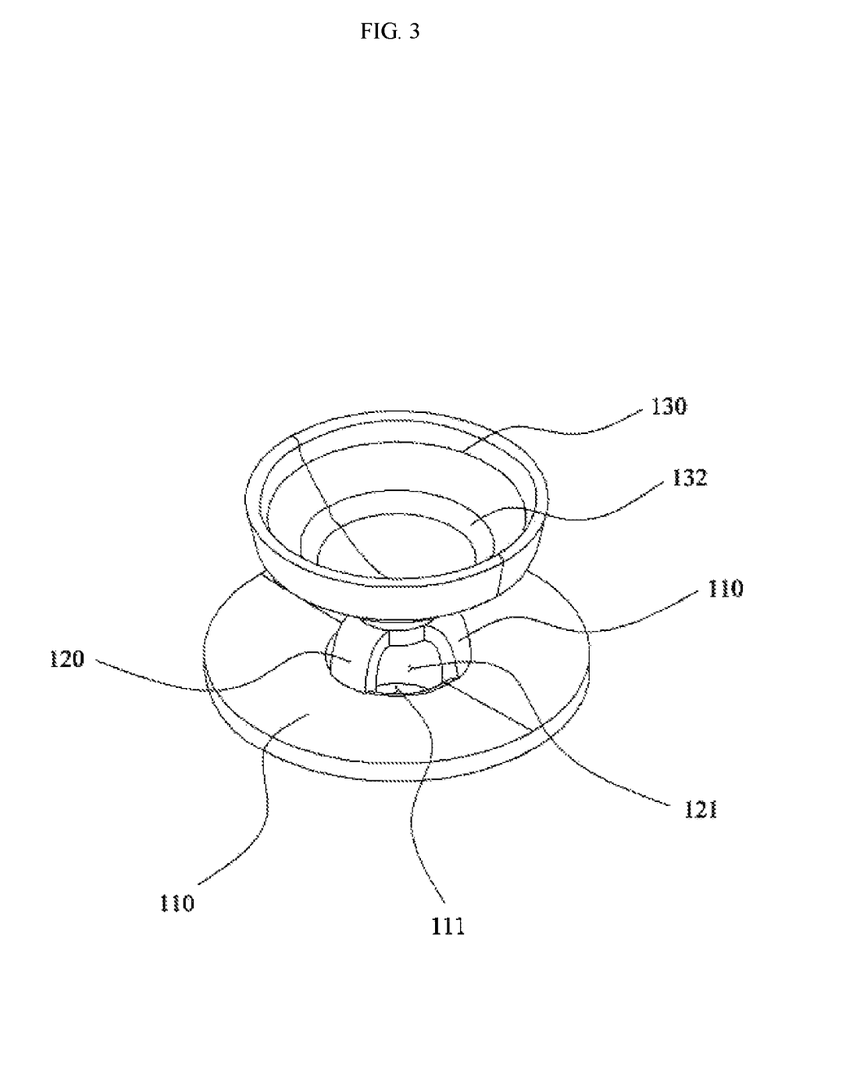
FIG. 3 is a perspective view showing an opened state of a sealing packing coupled to a container lid according to a preferred embodiment of the present disclosure

Referring to FIG. 2 or 3, the sealing packing 100 coupled to a container lid according to an embodiment of the present disclosure is largely composed of an airtight plate 110, an elastic support rack 120, and a pressing member 130.

Figure 1:
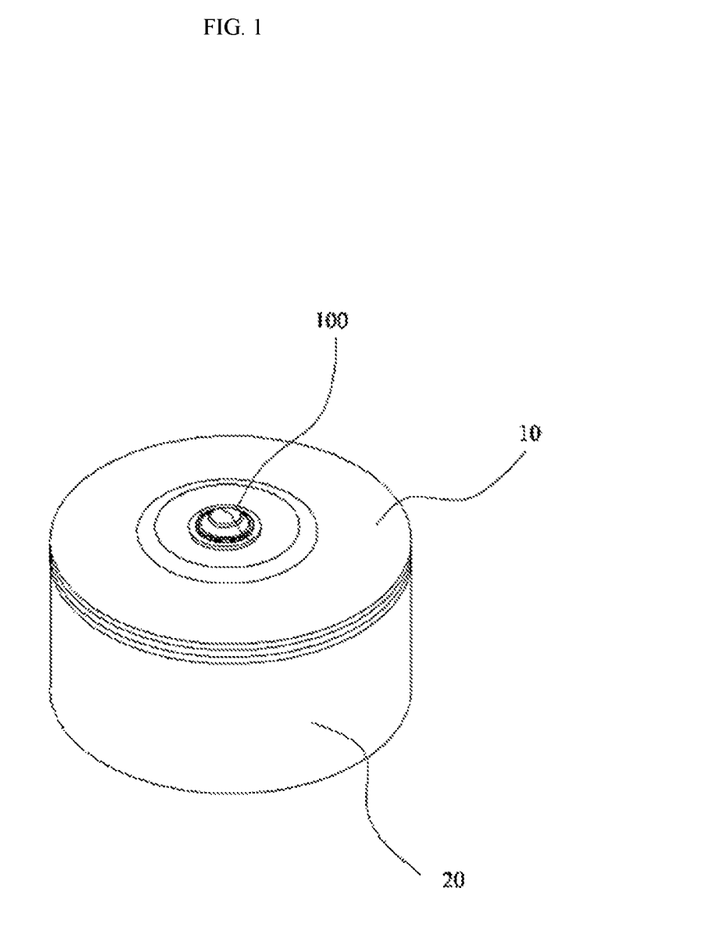
FIG. 1 is a perspective view showing a state in which a sealing packing coupled to a container lid according to a preferred embodiment of the present disclosure is mounted to the container lid.
Figure 4:
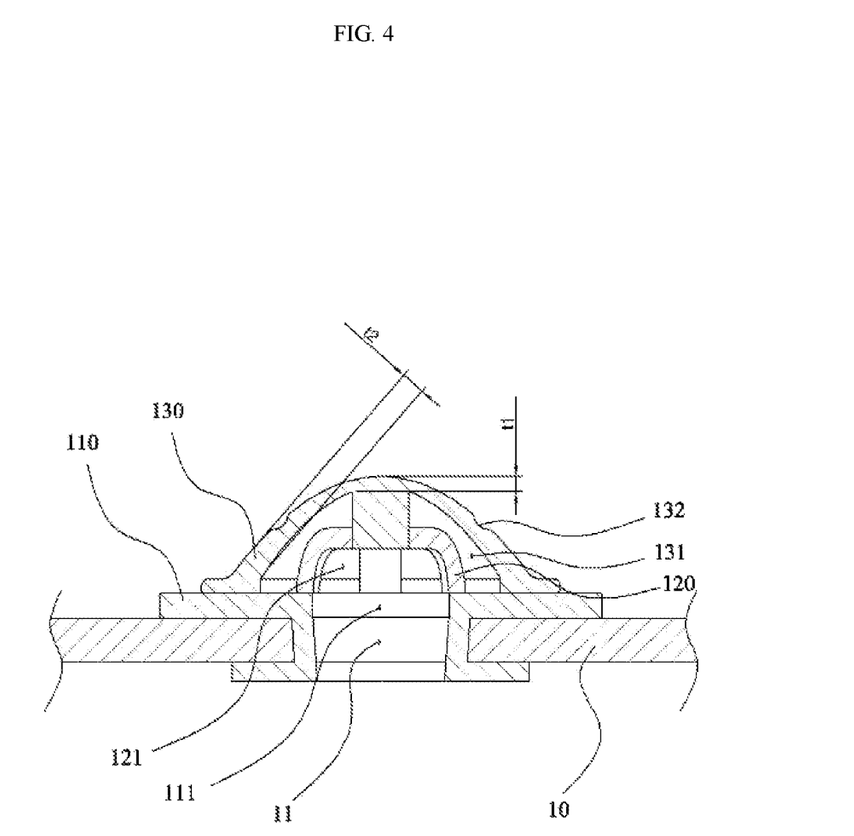
FIGS. 4 to 6 is an embodiment showing an operation process of a sealing packing coupled to a container lid according to a preferred embodiment of the present disclosure.

First, the airtight plate 110 will be described. The airtight plate 110 is a component coupled to correspond to a position of a first air passage hole 11 formed at an upper side of a container lid 10, as shown in FIG. 1, 2 or 4, and a second air passage hole 111 communicating with the first air passage hole 11 is formed in a center of the airtight plate 110 to change pressure in the container, thereby discharging air in the container 20 to an outside or allowing air to be introduced from the outside into the container 20.

Figure 5:
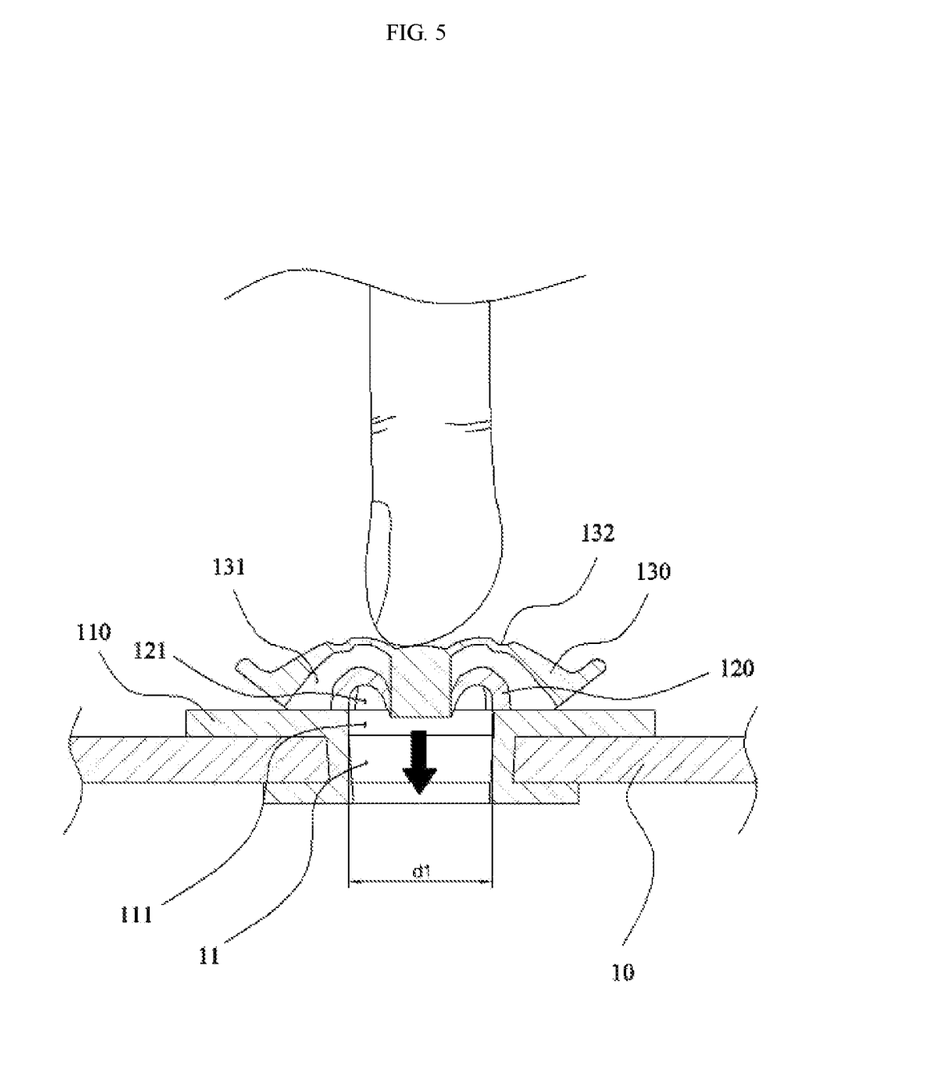

Meanwhile, as shown in FIG. 5, the second air passage hole 111 preferably has a size that causes a lower central portion of the pressing member 130 to be fitted into the second air passage hole 111 without causing forced fitting in a state in which the pressing member 130 is turned over as a user presses a central portion of the pressing member 130 with a finger.

In addition, the airtight plate 110 is connected to the pressing member 130, which will be described later, so that the pressing member 130 can be located at the upper side of the container lid 10.

Next, the elastic support rack 120 will be described. As shown in FIG. 3 or 4, the elastic support rack 110 is a component made of an elastic material that is capable of elastic deformation, such as silicone, in which a plurality of protruding upwardly around an edge of the connection hole 111 formed in the airtight plate 110 is formed, and the elastic support rack 110 is connected to the pressing member 130 to guide the pressing member 130 to move up and down so that the pressing member 130 can be turned over or restored to its original position.

In addition, a third air passage hole 121 through which air passes is formed between the elastic support racks 120, so that air passing through the first air passage hole 11 and the second air passage hole 111 is allowed to be discharged to the outside or outside air is introduced into the container 20, thereby changing pressure in the container 20.

Next, the pressing member 130 will be described. As shown in FIG. 2, 3 or 4, the pressing member 130 is formed in a curved shape and is a component connected to the elastic support rack 120 while covering the upper portion of the airtight plate 110 to change the pressure in the container 20 depending on a variation, and the pressing member 130 is formed of an elastic material capable of elastic deformation, such as silicon and the like, and may include a pressurization chamber 131 and a folding guide groove 132.

The pressurization chamber 131 refers to an inner space between the pressing member 130 and the airtight plate 110, and the pressurization chamber 131 becomes a vacuumed state or an atmosphere pressure state depending on a variation due to a pumping operation of the pressing member to guide a change of pressure in the container 20.

The folding guide groove 132 is a kind of groove formed in a circular shape on an upper circumferential surface of the pressing member 130, and, as shown in FIG. 5, in the process of turning the pressing member 130 over by pressing the pressing member 130, the folding guide groove 132 guides an outer surface of the pressing member 130 at the boundary of the folding guide groove 132 to be bent and a lower outer surface of the pressing member 130 to be turned over in an upward direction, thereby enabling the pressing member 130 to be easily turned over.

Meanwhile, the pressing member 130 has a semicircular cross-section so that the pressing member 130 can be turned over more easily than in the case of having a rectangular shape with corners.

In addition, in the present disclosure, as shown in FIG. 4, a thickness of the pressing member 130 increases from an upper central portion to a lower end portion, thereby enabling pressing member 130 to be easily turned over.

Hereinafter, an operation for releasing the sealed container 20, which is sealed using the sealing packing 100 coupled to the container lid, according to a preferred embodiment of the present disclosure will be described with reference to FIGS. 4 to 5.

First, as shown in FIG. 4, when the sealing packing 100 coupled to the container lid according to the preferred embodiment of the present disclosure is in its original state, the container lid 10 and the container 20 are in a sealed state.

Figure 6:
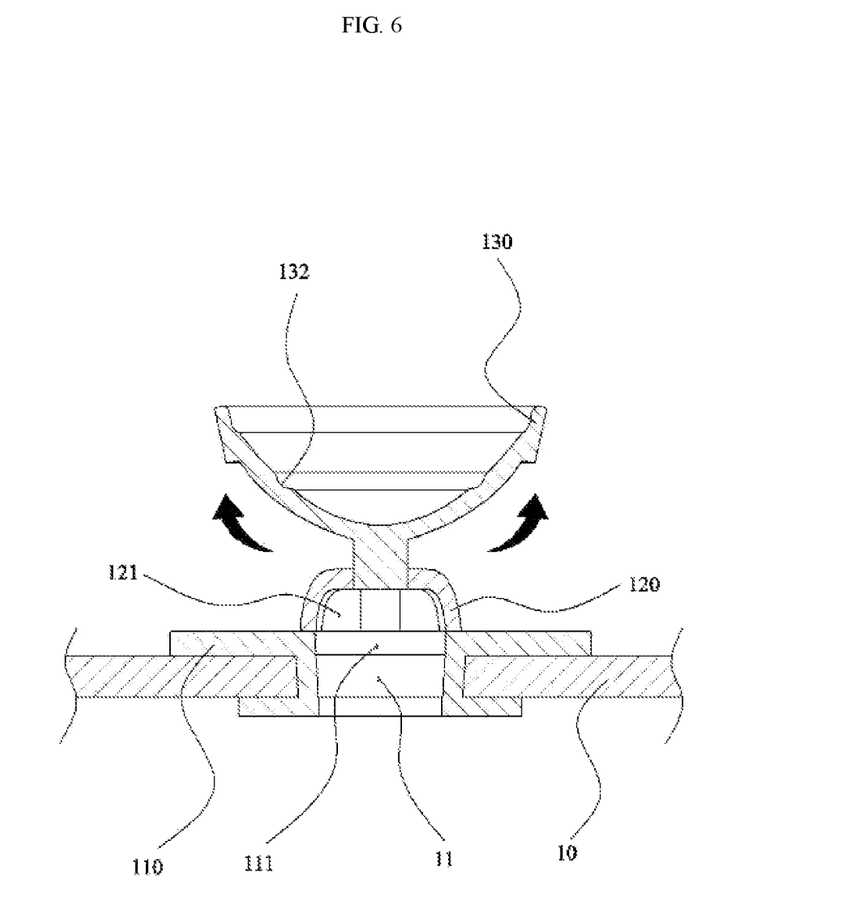

Next, as shown in FIG. 5, when a user presses the upper central portion of the pressing member 130, the pressing member 130 is elastically deformed and the pressurization chamber 131 becomes a contracted state, and then, as shown in FIG. 6, when the pressing member 130 is totally turned over, air in the container 20 is discharged to the outside through the first, second, and third air passage holes 11, 111, and 121 to cause the container 20 to be an atmospheric pressure state, and accordingly, the ability of sealing between the container lid 10 and the container 20 may be lowered, the container lid 10 may be easily removed from the container 20.

Conversely, when the pressing member 130 is deformed from the turned-over state to its original state and then the upper center portion of the pressing member 130 is pressed, the pressurization chamber 131 is changed to a contracted state from an expanded state, and then, when the user removes the pressure by moving a finger from the pressing member 130, the pressurization chamber 131 becomes the expanded state again so that the pressure in the container 20 is lower than atmospheric pressure, thereby bringing the container lid 10 and the container 20 to contact closely each other to form a sealed state.

Optimal embodiments have been disclosed in the drawings and the specification. Although specific terms have been used herein, these are only intended to describe the present embodiments and are not intended to limit the meanings of the terms or to restrict the scope of the present disclosure as disclosed in the accompanying claims. Therefore, those skilled in the art will appreciate that various modifications and other equivalent embodiments are possible from the above embodiments. Accordingly, the scope of the present disclosure should be defined by the technical spirit of the accompanying claims.

What is claimed is:

1. A sealing packing to be coupled to a container lid, wherein the sealing packing is coupled to a first air passage hole formed in the container lid, and wherein the sealing packing is configured to bring the container lid to tightly contact a container depending on pressurization, the sealing packing comprising:
   an airtight plate coupled to an upper side of the container lid and having a second air passage hole communicating with the first air passage hole formed in the container lid;
   a plurality of elastic support racks protruding upwardly from an edge of the second air passage hole to elastically deform, the plurality of elastic support racks including a first elastic support rack and a second elastic support rack;
   a third air passage hole through which air passes formed between the first elastic support rack and the second elastic support rack; and
   a pressing member provided to form a curved surface in an upper side of the airtight plate to enable elastic deformation, wherein upper sides of the elastic support racks are coupled to an inner upper side of the pressing member, and wherein a pressurization chamber is formed as a space inside the pressing member.

2. The sealing packing of claim 1, wherein the pressing member has a semicircular cross-section.

3. The sealing packing of claim 1, wherein a folding guide groove is recessed in an upper circumference of the pressing member to guide a lower outer surface of the pressing member to be turned over in a process of pressing a central portion of the pressing member.

4. The sealing packing of claim 2, wherein a thickness of the pressing member increases from an upper central portion to a lower end portion.

5. The sealing packing of claim 1, wherein the second air passage hole has a size that causes a lower central portion of the pressing member to be fitted into the second air passage hole without causing forced fitting in a state in which the pressing member is turned over as a user presses an upper central portion of the pressing member with a finger.

* * * * *